(12) United States Patent
Lu et al.

(10) Patent No.: US 12,223,379 B1
(45) Date of Patent: Feb. 11, 2025

(54) MICROWAVE-TOLERANT RFID TAG

(71) Applicant: Logistics & Supply Chain MultiTech R&D Centre Limited, Pok Fu Lam (HK)

(72) Inventors: Feng Lu, Pok Fu Lam (HK); Xiao Sheng Chen, Pok Fu Lam (HK); Jing Jung Tang, Pok Fu Lam (HK)

(73) Assignee: LOGISTICS AND SUPPLY CHAIN MULTITECH R&D CENTRE LIMITED, Pok Fu Lam (HK)

( * ) Notice: Subject to any disclaimer, the term of this patent is extended or adjusted under 35 U.S.C. 154(b) by 0 days.

(21) Appl. No.: 18/399,993

(22) Filed: Dec. 29, 2023

(51) Int. Cl.
*G06K 19/06* (2006.01)
*G06K 19/077* (2006.01)

(52) U.S. Cl.
CPC ... *G06K 19/0775* (2013.01); *G06K 19/07771* (2013.01); *G06K 19/07773* (2013.01)

(58) Field of Classification Search
CPC ........... G06K 19/0701; G06K 19/0776; G06K 19/07758; G06K 19/07773; G06K 19/07771; G06K 19/0775
USPC .................................... 235/492, 487, 462.46
See application file for complete search history.

(56) References Cited

U.S. PATENT DOCUMENTS

| | | | |
|---|---|---|---|
| 10,784,927 B2 * | 9/2020 | Yazaki | H01Q 1/2208 |
| 11,741,329 B2 * | 8/2023 | Yadegari | G01T 1/026 |
| | | | 235/492 |
| 2008/0084312 A1 * | 4/2008 | Daily | G06K 19/02 |
| | | | 340/572.8 |
| 2008/0143480 A1 * | 6/2008 | Egbert | H04B 5/77 |
| | | | 340/10.1 |
| 2016/0155852 A1 * | 6/2016 | Yamazaki | H01L 29/24 |
| | | | 257/43 |
| 2019/0081402 A1 * | 3/2019 | Kato | H01Q 1/36 |
| 2019/0321628 A1 * | 10/2019 | Stevenson | H03H 1/00 |
| 2020/0005110 A1 * | 1/2020 | Forster | G06K 19/07749 |
| 2020/0006840 A1 * | 1/2020 | Forster | H01Q 1/2225 |
| 2023/0211076 A1 * | 7/2023 | Weber | A61B 5/02055 |
| | | | 604/891.1 |

FOREIGN PATENT DOCUMENTS

| | | | | |
|---|---|---|---|---|
| DE | 102021118103 | * | 10/2022 | ....... G06K 19/07771 |
| EP | 4116880 | * | 1/2023 | ....... G06K 19/07771 |
| WO | 2022269541 | * | 12/2022 | ......... G06K 19/0773 |

* cited by examiner

*Primary Examiner* — Daniel St Cyr
(74) *Attorney, Agent, or Firm* — Renner, Kenner, Greive, Bobak, Taylor & Weber

(57) ABSTRACT

A fluid-tight envelope (13) encloses an RFID chip (11), a first array of conductors (14*a-d*) on an internal surface (19), and a second array of conductors (15*a-d*) fixed to an opposing internal surface (20) of a flexible outer wall (22) of the envelope (13). The outer wall (22) is urged inwardly by ambient pressure to press the conductors of the second array (15*a-d*) into electrical contact with the conductors of first array (14*a-d*) to thereby form an antenna (12). Fluid pressure in the chamber (21) that holds the antenna (12) tends to displace the outer wall (22) outwardly to thereby separate conductors of the first and second arrays (14*a-d*, 15*a-d*).

16 Claims, 1 Drawing Sheet

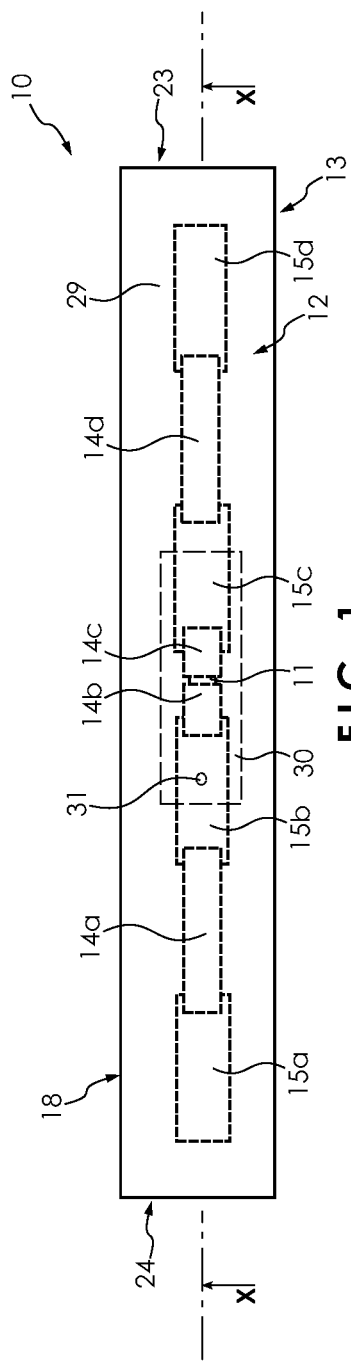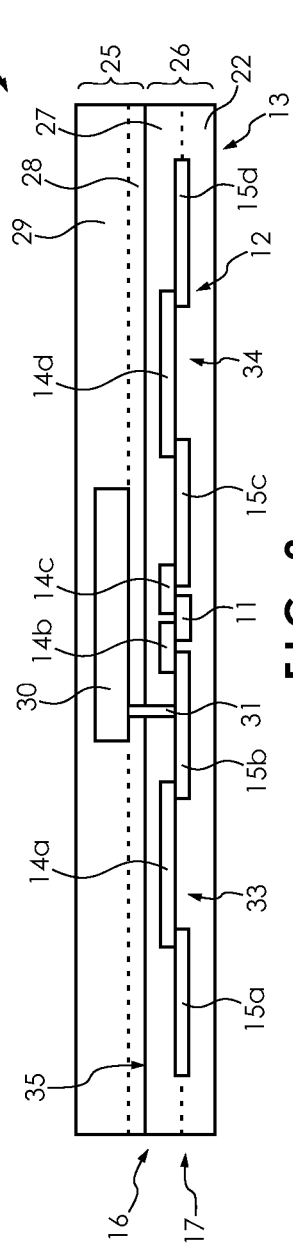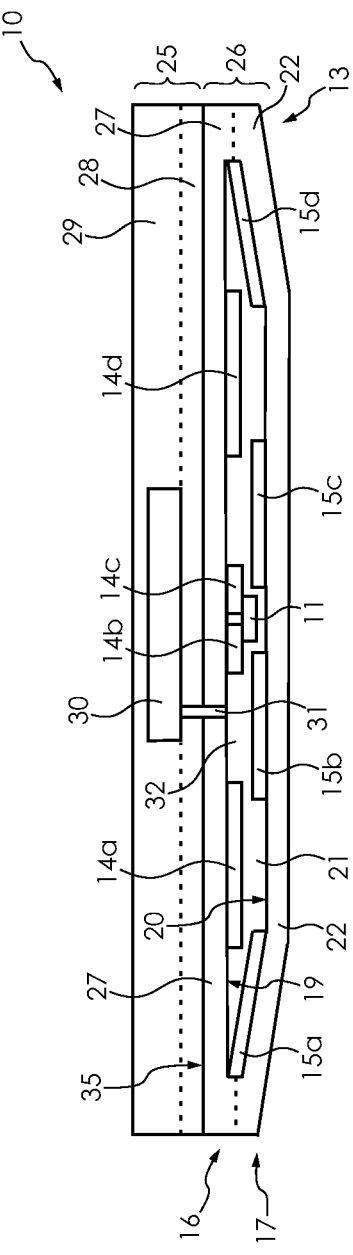

MICROWAVE-TOLERANT RFID TAG

TECHNICAL FIELD

The present invention relates to a Radio Frequency Identification (RFID) tag able to tolerate exposure to microwave radiation.

BACKGROUND OF THE INVENTION

RFID tags typically include an integrated circuit chip with a memory for storing information and an antenna for wireless communication, enclosed together in an envelope. RFID tags are used to provide identification information in response to a radio frequency interrogation signal which may also provide power to operate a passive RFID tag. An RFID tag attached to food items, or their packaging, has wide and expanding applications in tracking for ensuring food safety, for supply chain management, contactless payment and packaging recycling, among others. In these applications the RFID tag may be exposed to microwaves. In one particular application—the use of microwave ovens provided with internal RFID tag readers that control the oven according to data read from the RFID tag—such microwave exposure is unavoidable.

A drawback is that the prior art RFID tag is vulnerable to damage if it is irradiated in a microwave oven. In some cases, the prior art RFID tag can withstand microwaves in an oven for about five minutes and still perform satisfactorily, although repeated exposure can cause cumulative damage sufficient for failure. For applications where the food packaging is re-usable, or should be identified during recycling, then the RFID tag should allow for repeated microwave exposure while maintaining functionality. On the other hand, even for single-use applications it is important to mitigate against the possibility of a dangerous failure from the absorption of microwave energy which can also occur, such as by explosive vaporisation of metal comprising the antenna or explosion of the chip. Thus, there is a need to develop an RFID tag that is more tolerant of microwave radiation. It is an object of the present invention to address this need or, more generally, to provide an improved RFID tag.

DISCLOSURE OF THE INVENTION

According to one aspect of the present invention there is provided an RFID tag comprising: an RFID chip;
a plurality of first conductors spaced apart from one another in a first array with a shape of at least part of an antenna;
a plurality of second conductors spaced apart from one another in a second array with the shape of the at least part of the antenna;
an envelope comprising insulative material, the envelope enclosing the RFID chip, the plurality of first conductors and the plurality of second conductors, the envelope comprising: a first internal surface, an outer wall of flexible material disposed outside the first internal surface, a communicating channel and a fluid reservoir holding a fluid;
wherein the outer wall substantially covers the first internal surface and has a second internal surface disposed opposite the first internal surface, such that the first and second internal surfaces bound an antenna chamber;
the communication channel extends between the fluid reservoir and the antenna chamber for fluid communication therebetween;
and wherein the plurality of first conductors are fixed on the first internal surface and the plurality of second conductors are fixed on the second internal surface,
the outer wall is urged inwardly by ambient pressure to press the plurality of second conductors into electrical contact with the plurality of first conductors and thereby form the at least part of the antenna, and
a pressure of fluid in the antenna chamber tends to displace the outer wall outwardly to thereby separate the plurality of second conductors from the plurality of first conductors.

Preferably the first internal surface and the second internal surface are planar and the plurality of first conductors and the plurality of second conductors are flat pieces with respective planar attachment faces fixed to respective ones of the first internal surface and the second internal surface, with planar abutment faces opposite the planar attachment faces. Preferably the flat pieces are substantially rectangular.

The respective shape of the first and second arrays can be linear or arcuate, or comprise generally planar combinations of linear and arcuate lengths, including triangular, square, spiral, boustrophedonic or meander shapes.

Preferably spaces between adjacent conductors of one of the first conductors and the second conductors are disposed opposite respective opposing conductors of the other of the first conductors and the second conductors, such the opposing conductors span respective ones of the spaces. Alternatively, at least one opposing conductor may span two or more of the spaces.

Preferably the fluid is gas and ambient pressure provides the predominant force by which the outer wall is urged inwardly and a pressure of gas in the fluid reservoir is below ambient pressure. Preferably the outer wall has a degree of resilience which makes a minor contribution to the force by which the outer wall is urged inwardly.

Preferably the first conductors and the second conductors include metal and the gas includes substantially no component that oxidises, or otherwise chemically reacts with, the metal. For instance, lower-cost metals, such as copper and aluminium, may be used for the conductors when the gas comprises nitrogen or carbon dioxide.

Preferably the at least part of the antenna comprises two arms of substantially equal lengths that form poles of a dipole, wherein the first conductors and second conductors are pressed together to form two arms, the two arms are arranged end-to-end with the RFID chip connected therebetween and supported on a pair of conductors of one of the first conductors and the second conductors that are adjacent one another.

Preferably the antenna chamber is elongate and the pair of conductors are disposed proximate a central position substantially equidistant from longitudinally opposing ends of the antenna chamber.

Preferably the pair of conductors are disposed proximate a central position substantially equidistant from a periphery of the outer wall.

Preferably the envelope includes a laminate comprising an outer sheet in which a recess is formed and an inner sheet through which the communication channel extends, wherein recess and the inner sheet bound the fluid reservoir and the inner and outer sheets are laminated together.

Preferably the inner wall and the outer wall comprise films of a first polymer.

Preferably the inner sheet and the outer sheet comprise a second polymer with greater stiffness than the first polymer.

This invention thus provides an RFID tag which is effective and efficient in operational use, which has an overall simple design which minimizes manufacturing costs. Advantageously, it has been found that effectively segmenting the antenna into spaced apart conductors in this manner mitigates the absorption of microwave energy that causes failure of the RFID tag and it is believed that this may be achieved by restricting the amount of charge able to be built up on the surfaces of the conductors compared to that which may build up along the length of a conventional antenna.

BRIEF DESCRIPTION OF THE DRAWINGS

Preferred forms of the present invention will now be described by way of example with reference to the accompanying drawings, wherein:

FIG. 1 is a schematic top view of an RFID tag according to a preferred embodiment of the invention;

FIGS. 2 and 3 are schematic sectional views along line XX of FIG. 1 showing the RFID tag in an operating state and non-operating state, respectively.

DESCRIPTION OF THE PREFERRED EMBODIMENTS

Referring to FIGS. 1 and 2, an RFID tag 10 comprises an RFID chip 11 and an antenna 12 which are enclosed together in an envelope 13 of insulative material. The antenna 12 may be of linear form, and the envelope 13 may have a generally rectangular prismatic form elongated in a longitudinal direction of the antenna 12. In embodiments, the RFID tag 10 may be an active RFID tag including an internal power source, such as a battery (not shown).

The antenna 12 is an assembly of first conductors 14$a$-$d$ and second conductors 15$a$-$d$, which may be metal pieces that are flat and of generally the same thickness. The first conductors 14$a$-$d$ are generally coplanar and spaced apart from one another in a first array 16 that has the linear shape of the antenna 12. The second conductors 15$a$-$d$ are generally coplanar and spaced apart from one another in a second array 17 that also has the linear shape of the antenna 12. The antenna 12 is thus an elongate assembly formed by holding the first conductors 14$a$-$d$ in electrical contact with the second conductors 15$a$-$d$. In the preferred laminated construction shown, alternative antennae should take planar shapes, as formed by linked coplanar lines and arcs, and the invention is certainly not limited to the illustrated linear antenna.

As best seen in FIG. 3, first conductors 14$a$-$d$ may be fixed upon a planar first internal surface 19 of the envelope 13, with the second conductors 15$a$-$d$ fixed upon a planar second internal surface 20 disposed opposite the first internal surface 19, such that the first and second internal surfaces 19, 20 bound an antenna chamber 21. The second internal surface 20 is on an outer wall 22 disposed outside the first internal surface 19 and FIG. 3 shows the outer wall 22 displaced outwardly, where it expands the antenna chamber 21 (in a manner represented schematically) and separates the first and second conductors 14$a$-$d$, 15$a$-$d$, thereby placing the RFID tag in a non-operating state. The chip 11 may be located in a central position substantially equidistant from longitudinally opposing ends 23, 24 of the antenna chamber 21, or so that it is substantially equidistant from a periphery 18 of the outer wall 22.

The envelope 13 may be of laminated construction, comprising two polymer laminates: a laminate 26 comprising the outer wall 22 bonded to an inner wall 27, and a block 25 comprising an inner sheet 28 bonded to an outer sheet 29, shown separated by dashed lines in FIGS. 2 and 3. The block 25 and laminate 26 are also laminated together, being bonded at a planar interface 35. At this interface 35, as well as in other interfaces within the block 25 and laminate 26, an adhesive layer, such as a coating, or a separate adhesive sheet, may be provided for joining the layers, and are not shown in the drawings. The inner and outer walls 22, 27 may be films of a relatively flexible polymer such as polyester, while the inner and outer sheets 28, 29 may be formed of a relatively stiffer polymer, such as polypropylene.

The block 25 includes a fluid reservoir 30, which may be made by a recess, made in the outer sheet 29 that is generally closed by the inner sheet 28. The fluid reservoir 30 may thus have a planar inner face formed by the inner sheet 28, and the recess may be of generally rectangular prismatic form, and manufactured as by moulding of the outer sheet 29.

At least one communication channel 31 extends transversely through both the inner sheet 28 and the inner wall 27, and across the interface 35, to connect the fluid reservoir 30 to the antenna chamber 21. The bonding between the layers 22, 27, 28, 29 of the envelope 13 is gas-tight and a gas, such as nitrogen, fills the fluid reservoir 30, the antenna chamber 21 and the communication channel 31 and is at a sub-atmospheric pressure. To achieve this, the lamination process, including the bonding of the outer sheet 29 to the inner sheet 28, and the bonding of the block 25 to the laminate 26, may be performed in an environment comprising the gas at sub-atmospheric pressure. Peripheral edges of the inner and outer walls 22, 27 are bonded together to form the antenna chamber 21. In this manner, in its normal operating state as shown in FIG. 2, the outer wall 22 is urged inwardly by ambient pressure to press the second conductors 15$a$-$d$ into electrical contact with the first conductors 14$a$-$d$ and thereby form the antenna 13.

It will be understood that the drawings are schematic and, for instance, the first and second conductors 14$a$-$d$, 15$a$-$d$ are thin, of the order of micrometres, while the inner and outer walls 22, 27 may be of the order of tens of micrometres. Thus there is only a very small volume of gas in the antenna chamber 21 in the normal operating state shown in FIG. 2. In a two-stage manufacturing process, firstly, a film of conductor is deposited on the inner and outer walls 22, 27, then the first and second conductors 14$a$-$d$, 15$a$-$d$ may be fabricated by chemical etching. The block 25 may be much thicker, as with the outer sheet 29 being about 2 mm thick and the inner sheet 28 about 1 mm thick. In this way the block 25, also being of stiffer material, provides stability and the main structure of the envelope 13.

The first and second conductors 14$a$-$d$, 15$a$-$d$ may be of generally rectangular outline and arranged in the two arrays such that a space in one array is spanned by a conductor in the other array. For instance, a space 32 is provided between adjacent first conductors 14$a$ and 14$b$ and is spanned by the second conductor 15$b$, with opposite ends of the second conductor 15$b$ pressed into electrical contact with the first conductors 14$a$ and 14$b$ in the operating state.

The antenna 12 comprises two arms 33, 34 of substantially equal lengths, with arm 33 comprising the mutually contacting first conductors 14$a$ and 14$b$ and the second conductors 15$a$ and 15$b$, and the arm 34 comprising the mutually contacting first conductors 14$c$ and 14$d$ and the second conductors 15$c$ and 15$d$. The two arms 33, 34 thus form a dipole, and they are coaxial and arranged end-to-end with the RFID chip 11 connected therebetween. The RFID chip 11 is supported on and connected to both of the adjacent first conductors 14b, 14c, as by flip chip bonding with the use of an anisotropic conductive paste.

When the RFID tag 10, in its normal operating state, is irradiated with microwaves, electrical current induced in the antenna 12 may be dissipated as heat, which tends to be absorbed by the gas in the antenna chamber 21, causing the gas to expand. Increased internal pressure expands the antenna chamber 21, preferentially deflecting the relatively flexible outer wall 22 outwards, and drawing gas into the antenna chamber 21 from the reservoir 30. As the maximum deflection of the outer wall 22 occurs near its centre, a relatively low gas pressure is sufficient to initially move the second conductors 15b and 15c out of electrical contact with the first conductors 14b and 14c respectively, thus electrically and thermally isolating the chip 11 from the antenna 12. Relatively higher gas pressure in the antenna chamber 21 tends to further displace the outer wall 22 outwardly to thereby separate all of the second conductors 15a-d from the first conductors 14a-d. With all of the second conductors 15a-d separated from all of the first conductors 14a-d substantially less microwave energy is absorbed by the RFID tag 10.

Moreover, when the temperature of the gas in the antenna chamber 21 drops sufficiently, ambient pressure acts to push the outer wall 22 inward, restoring the electrical contact between the conductors, and thus restoring the antenna 12 and the normal operation of the RFID tag 10.

Aspects of the present invention have been described by way of example only and it should be appreciated that modifications and additions may be made thereto without departing from the scope thereof.

The invention claimed is:

1. An RFID tag comprising:
   an RFID chip;
   a plurality of first conductors spaced apart from one another in a first array with a shape of at least part of an antenna;
   a plurality of second conductors spaced apart from one another in a second array with the shape of the at least part of the antenna;
   an envelope comprising insulative material, the envelope enclosing the RFID chip, the plurality of first conductors and the plurality of second conductors, the envelope comprising: a first internal surface, an outer wall of flexible material disposed outside the first internal surface, a communicating channel and a fluid reservoir holding a fluid;
   wherein the outer wall substantially covers the first internal surface and has a second internal surface disposed opposite the first internal surface, such that the first and second internal surfaces bound an antenna chamber;
   the communication channel extends between the fluid reservoir and the antenna chamber for fluid communication therebetween;
   and wherein the plurality of first conductors are fixed on the first internal surface and the plurality of second conductors are fixed on the second internal surface,
   the outer wall is urged inwardly by ambient pressure to press the plurality of second conductors into electrical contact with the plurality of first conductors and thereby form the at least part of the antenna, and
   a pressure of fluid in the antenna chamber tends to displace the outer wall outwardly to thereby separate the plurality of second conductors from the plurality of first conductors.

2. The RFID tag of claim 1, wherein the first internal surface and the second internal surface are planar and the plurality of first conductors and the plurality of second conductors are flat pieces with respective planar attachment faces fixed to respective ones of the first internal surface and the second internal surface, with planar abutment faces opposite the planar attachment faces.

3. The RFID tag of claim 1, wherein spaces between adjacent conductors of one of the first conductors and the second conductors are disposed opposite respective opposing conductors of the other of the first conductors and the second conductors, such the opposing conductors span respective ones of the spaces.

4. The RFID tag of claim 1, wherein the fluid is gas and ambient pressure provides the predominant force by which the outer wall is urged inwardly and a pressure of gas in the fluid reservoir is below ambient pressure.

5. The RFID tag of claim 4, wherein the first conductors and the second conductors include metal and the gas includes substantially no component that oxidises, or otherwise chemically reacts with, the metal.

6. The RFID tag of claim 1, wherein the at least part of the antenna comprises two arms of substantially equal lengths that form poles of a dipole, wherein the first conductors and second conductors are pressed together to form two arms, the two arms are arranged end-to-end with the RFID chip connected therebetween and supported on a pair of conductors of one of the first conductors and the second conductors that are adjacent one another.

7. The RFID tag of claim 6, wherein the antenna chamber is elongate and the pair of conductors are disposed proximate a central position substantially equidistant from longitudinally opposing ends of the antenna chamber.

8. The RFID tag of claim 6, wherein the pair of conductors are disposed proximate a central position substantially equidistant from a periphery of the outer wall.

9. The RFID tag of claim 6, wherein the first internal surface and the second internal surface are planar and the plurality of first conductors and the plurality of second conductors are flat pieces with respective planar attachment faces fixed to respective ones of the first internal surface and the second internal surface, with planar abutment faces opposite the planar attachment faces.

10. The RFID tag of claim 9, wherein spaces between adjacent conductors of one of the first conductors and the second conductors are disposed opposite respective opposing conductors of the other of the first conductors and the second conductors, such the opposing conductors span respective ones of the spaces.

11. The RFID tag of claim 10, wherein the envelope includes a laminate comprising an outer sheet in which a recess is formed and an inner sheet through which the communication channel extends, wherein recess and the inner sheet bound the fluid reservoir and the inner and outer sheets are laminated together.

12. The RFID tag of claim 11, wherein the inner wall and the outer wall comprise films of a first polymer.

13. The RFID tag of claim 12, wherein the inner sheet and the outer sheet comprise a second polymer with greater stiffness than the first polymer.

14. The RFID tag of claim 1, wherein the envelope includes a laminate comprising an outer sheet in which a recess is formed and an inner sheet through which the communication channel extends, wherein recess and the inner sheet bound the fluid reservoir and the inner and outer sheets are laminated together.

15. The RFID tag of claim 14, wherein the inner wall and the outer wall comprise films of a first polymer.

16. The RFID tag of claim 15, wherein the inner sheet and the outer sheet comprise a second polymer with greater stiffness than the first polymer.

* * * * *